April 14, 1936. S. NEDBAL 2,037,480

DETACHABLE BLADE FOR AGRICULTURAL IMPLEMENTS

Filed Nov. 8, 1934

INVENTOR
Stephan Nedbal
BY Harvey Lea Dodson
ATTORNEY

Patented Apr. 14, 1936

2,037,480

UNITED STATES PATENT OFFICE 2,037,480

DETACHABLE BLADE FOR AGRICULTURAL IMPLEMENTS

Stephan Nedbal, Lakewood, N. J.

Application November 8, 1934, Serial No. 752,027

1 Claim. (Cl. 97—68)

My invention relates more particularly to that class of agricultural implements which are called hoes and is more specifically designed for use in weeding, although it may be utilized for cultivating purposes as well.

As is well known, hoes of this character have relatively thick blades which rapidly become dull in use and have to be continually sharpened either by file or on a grind stone. Moreover in a comparatively short time the repeated sharpenings cut down the size of the hoe so that it is no longer useful and must be thrown away. This necessitates throwing the handle away with it.

My invention has for its principal object to provide an implement of the character described in which the cutting blade will be detachably secured to a body portion so that it can be renewed quickly and easily and without any great expense in which the handle can be used for an indefinite period of time.

A further object of the invention is to provide a blade having a longitudinal corrugation which serves a double purpose. It permits the use of an extremely thin blade without sacrifice of rigidity and which is to a very considerable degree self sharpening. In fact in practice I have found that in the use of a hoe equipped with my improved detachable blade, the cutting edge gets sharp enough to cut paper.

My means of accomplishing the foregoing objects may be more readily understood by having reference to the accompanying drawing which is hereunto annexed and is a part of this specification, in which—

Similar reference numerals refer to similar parts throughout the entire description.

Figure 1:
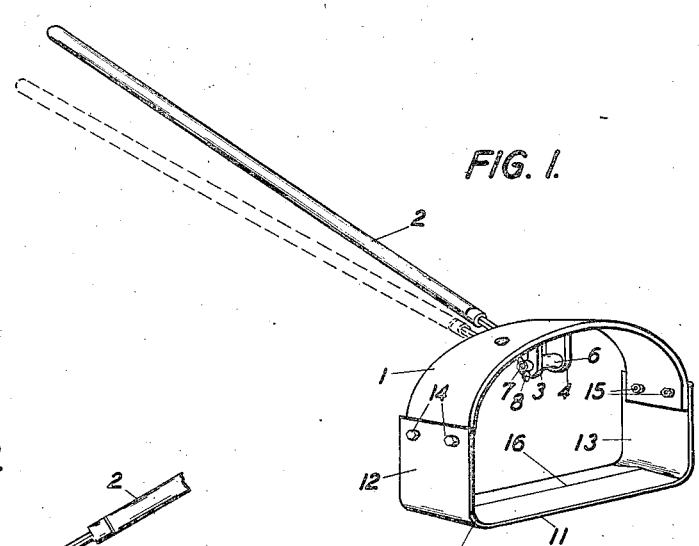
Fig. 1 is a perspective view of a hoe equipped with my improved detachable blade.

As shown in the drawing, the device comprises a body member 1, provided with a handle 2 which is adjustably secured to the body member 1. As illustrated, a pair of downwardly depending lugs 3 and 4 are secured to the body portion 1, adjacent its center.

The handle 2 is provided with a shank 5 which terminates in a sleeve 6 which fits between the lugs 3 and 4. A bolt 7 passes through the lugs 3 and 4 and the sleeve 6, a wing nut 8 being mounted upon the threaded end of the bolt, the tightening of which serves to draw the head 9 of the bolt 7 tightly against the lug 4 thus holding the shank 5 and in turn the handle 2 in any desired position. This also permits the handle to be swung to the opposite side of the body member 1 so as to use both sides of the cutting blade 10.

This cutting blade 10 is formed of a strip of extremely thin metal and consists of a substantially horizontal portion 11 which terminates in upwardly extending arms 12 and 13. These arms are provided with openings through which may be passed bolts 14 and 15 which serve to hold the ends 12 and 13 of the blade 10 to the body portion 1.

Figure 2:
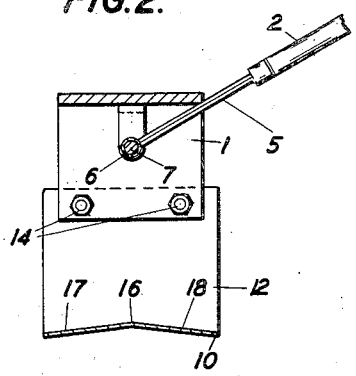
Fig. 2 is a fragmentary detail view in section showing the preferable form of blade.

The horizontal portion 11 of the blade 10 is preferably formed with a longitudinal corrugation 16 which is more clearly shown in Fig. 2, the walls 17 and 18 of the corrugation 16 are preferably inclined inwardly and upwardly. This has the effect of materially facilitating the sharpening of the edge of the blade. These blades are preferably only fifteen thousandths of an inch in thickness and are preferably hardened to prolong their usefulness.

Figure 3:
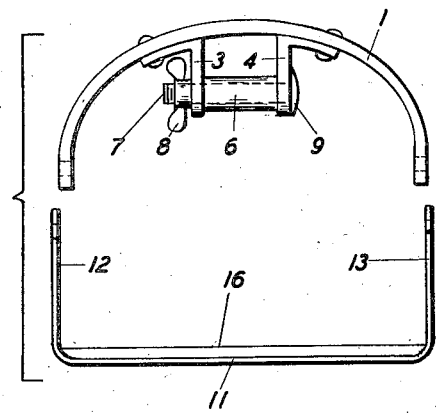
Fig. 3 is an enlarged detailed view showing the blade detached from the body portion.

Practice has shown that it is not necessary ever to sharpen this blade after it is put in use and when one side is worn out by shifting the position of the handle 2, then when both sides have been worn out by continued use it is a comparatively simple matter to loosen the bolts 14 and 15 and take the blade 10 off of the body member 1, as clearly seen in Fig. 3, when the worn out blade can be thrown away and a new one placed in position. Although I have described with some degree of particularity, the manner of fastening the blade to the body member and the manner of fastening the handle to the body member, I do not wish to be understood as limiting myself thereby to such specific construction, as the drawing and description are only for the purpose of disclosing a preferred embodiment of my invention and numerous ways of securing the blade detachably to the body member will suggest themselves to persons skilled in the art and I therefore do not wish to be understood as limiting myself except as such limitations may appear in the hereinafter appended claim. I prefer the blade with the longitudinal corrugation because it imparts a very substantial degree of rigidity to the blade without increasing the thickness thereof.

Having described my invention what I regard as new and desire to secure by Letters Patent is:

In a device of the character described, a body member, a handle secured thereto, a double edged blade formed of a strip of extremely thin steel comprising a substantially horizontal portion terminating in upwardly extending arms said horizontal portion being formed with a longitudinal corrugation which extends from one arm to the other, the sides of said corrugation being plane and inclined inwardly of the blade and upwardly, there being a plurality of registering apertures in the arms and body portion, bolts in said apertures to secure said blade to said body portion.

STEPHAN NEDBAL.